June 13, 1950
G. W. KASCHMITTER
2,511,272
SAFETY RELEASE HITCH
Filed May 16, 1949
2 Sheets-Sheet 2
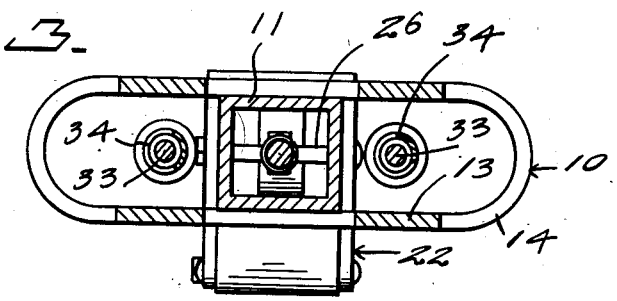
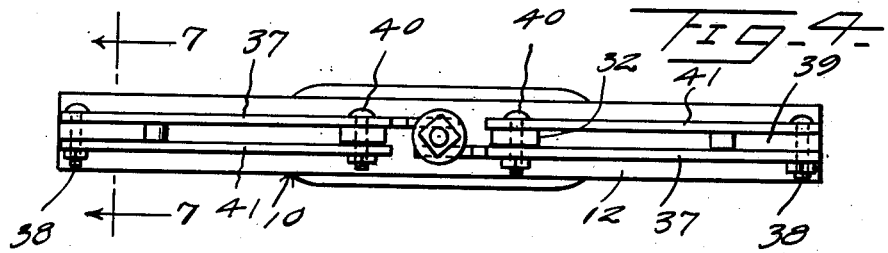
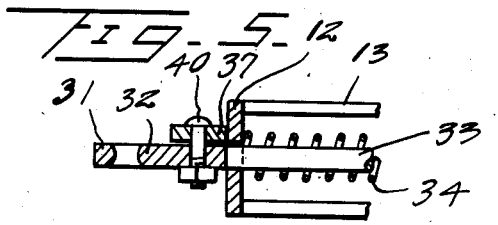
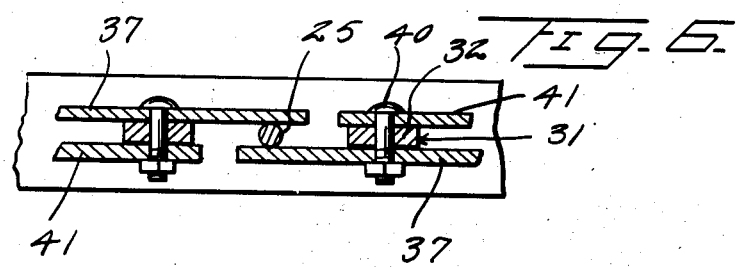
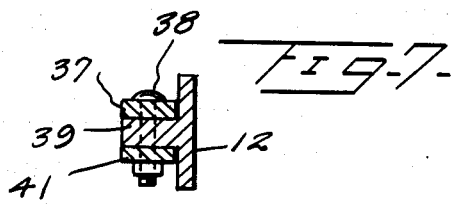
INVENTOR.
George W. Kaschmitter
BY
Kimmel & Crowell ATTORNEYS Patented June 13, 1950

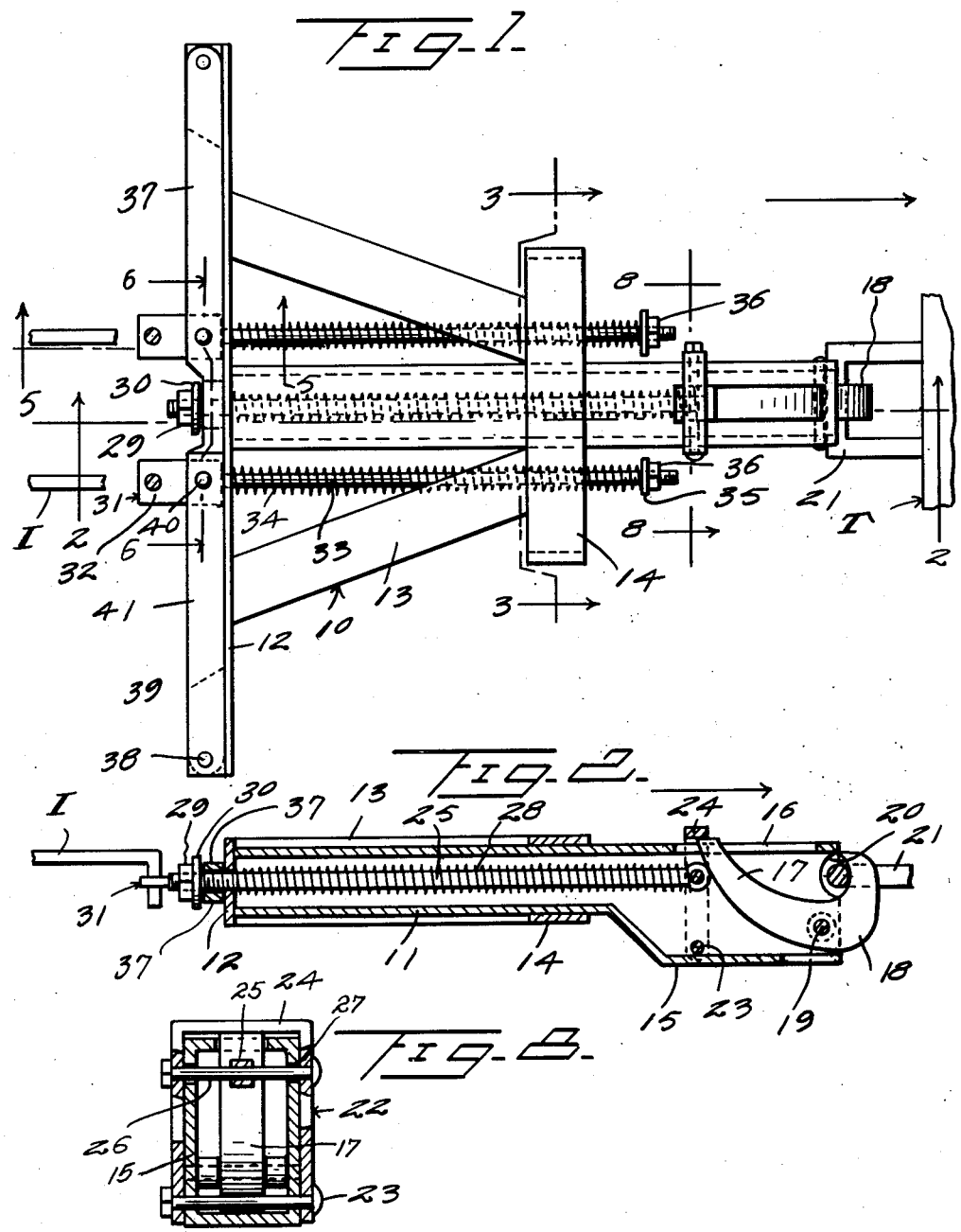

2,511,272

UNITED STATES PATENT OFFICE 2,511,272

SAFETY RELEASE HITCH

George W. Kaschmitter, Fenn, Idaho

Application May 16, 1949, Serial No. 93,572

2 Claims. (Cl. 280—33.16)

This invention relates to hitches.

An object of this invention is to provide a hitch for connection between a tractor and a pair of farm implements, such as a pair of plows, which is so constructed and arranged that under normal pulling stresses the implements will remain connected to the tractor, whereas under abnormal conditions, such as where one implement strikes an obstruction, the hitch will be automatically uncoupled. In this manner neither the implement engaging the obstruction nor the tractor will be damaged.

Another object of this invention is to provide a hitch for multiple implements which can be readily adjusted to provide for release of one or both implements when an abnormal pulling strain is exerted by the tractor through unusual drag on one or both implements.

With the above and other objects in view, my invention consists in the arrangement, combination and details of construction disclosed in the drawing and specification, and more particularly pointed out in the appended claims.

In the drawing:

Figure 1 is a plan view of a trailer hitch constructed according to an embodiment of this invention.

Figure 2 is a sectional view taken on the line 2—2 of Figure 1.

Figure 3 is a sectional view taken on the line 3—3 of Figure 1.

Figure 4 is a detailed rear elevation of the device.

Figure 5 is a fragmentary sectional view taken on the line 5—5 of Figure 1.

Figure 6 is a sectional view taken on the line 6—6 of Figure 1.

Figure 7 is a sectional view taken on the line 7—7 of Figure 4.

Figure 8 is a sectional view taken on the line 8—8 of Figure 1.

Referring to the drawings, the numeral 10 designates generally a frame structure which includes an elongated longitudinally extending tubular member 11 which has secured to the rear end thereof a transversely extending rear bar 12. The frame 10 also includes pairs of forwardly convergent bracing bars 13 which are secured at their rear divergent ends to the rear bar 12. Bars 13 are secured at their convergent ends to a looped frame member 14. The looped frame member 14 is welded or otherwise fixedly secured to the central frame member 11 at a point rearwardly of the forward end of latter.

The frame member 11 includes a forwardly disposed housing 15 which is open at its front end, and is formed with an elongated opening 16 within which the shank 17 of a coupling hook 18 is adapted to loosely engage. The hook 18 is pivoted on a shaft 19 extending between the sides of the housing 15, and the sides of the housing 15 are formed with a cutout or notch 20 within which a ring or loop 21 carried by the tractor T is adapted to releasably engage.

The hook 18 is releasably held in a coupling position by members of an inverted U-shaped latch member 22 which is rockably mounted on a pivot 23 extending across the housing 15. The latch member 22 in operative position is adapted to be disposed in substantially vertical position as shown in Figure 2 with the bight 24 thereof engaged with the rear end of the shank 17. The latch member 22 has extending rearwardly therefrom an elongated rod 25 which is secured at its front end to a transversely extending bolt 26 which is secured between the sides of the latch member 22. The bolt 26 engages loosely through a pair of arcuate openings 27 which are formed in the opposite sides of the housing 15, and the latch member 22 is constantly urged forwardly to a latching position by means of a spring 28.

The spring 28 engages about the rod 25 bearing at its front end against the bolt 26 and bearing at its rear end against the frame bar 12. The rod 25 loosely and slidably engages through the rear bar 12 and has a nut 29 threaded on the rear end thereof with a washer 30 secured on the nut 29.

A pair of implement or trailer coupling members generally designated as 31 are disposed one on each side of the frame member 11. Each implement or trailer coupling members 31 includes a plate 32 which has secured thereto an elongated forwardly extending rod 33 which is slidable through the rear frame bar 12. A spring 34 is disposed about the rod 33 bearing its rear end against the front side of bar 12 and bearing its front end against a washer 35 which abuts against a nut 36 which is threaded on rod 33. Each spring 34 is adapted to be tensioned to the point where under normal pull of the implement or trailer the coupling or element 32 will be held against movement relative to the frame member 12. Under abnormal pull coupling element 32 will be pulled rearwardly, and at this time the latch member 22 is adapted to be swung rearwardly to a released position by means of elongated releasing lever 37 which is pivotally mounted on a pivot 38 carried by a lug 39 which is secured to the rear side of frame bar 12. The inner end of lever 37 extends across the rear portion of rod 25 and is positioned between washer 30 and the rear side of frame bar 12.

The coupling member 32 is connected to an intermediate portion of lever 37 by means of a pivot 40. There is a releasing lever 37 for each coupling element 32 and the inner ends of these releasing levers are disposed in overlapping position as shown in Figure 6 with the end of one lever above rod 25 and the end of the other lever below rod 25. The releasing levers 37 are supported from the lugs 39 and pivots by means of supporting levers 41 which engage the pivots 38 and 40 on the opposite sides of lugs 39 from the levers 37.

In the use and operation of this hitch, the hook 18 is connected with the coupling element 21 with the tractor T, and the coupling elements 32 are connected to each of the implements I which are to be pulled by the tractor. These implements may be plows or other earthworking implements. Under normal conditions of operation, the springs 34 will tightly hold the trailer coupling members 32 against the rear frame bar 12. However, in the event one or both of the implements encounters an obstruction, resulting in excessive pull on the implement by the tractor, one or both coupling members 32 will move rearwardly against the tension of springs 34, and as the coupling member or members 32 move rearwardly the latch releasing lever 37 will rock rearwardly and will pull rod 25 rearwardly to swing latching member 22 to a released position. With latch member 22 in released position, hook 18 is free to rock downwardly and forwardly, thereby releasing coupling member 21 from hook 18. With an overload releasing hitch as hereinbefore described the implements connected to the tractor by means of this hitch will not be damaged by encountering an obstruction, such as a stone, root, or the like.

What I claim is:

1. A trailer hitch comprising a frame, a tractor coupling hook pivotally carried by said frame, a spring tensioned trailer coupling member movably carried by said frame, a latch member movably carried by said frame, an elongated rod connected at one end to said latch member and extending rearwardly therefrom, a release lever pivotally carried by said frame and having an end extending in the direction of the rear end of said rod, means pivotally securing an intermediate portion of said lever to said trailer coupling member, a spring constantly biasing said latching member toward latching position, and a part carried by said rod disposed in the path of pivotal rotation of said lever in one direction whereby excessive rearward pull on said tractor coupling hook will rock said lever in said one direction to thereby move said latch member to released position.

2. A trailer hitch comprising a frame, a tractor coupling hook pivotally carried by the forward end of said frame, a pair of spring tensioned trailer coupling members slidably carried by said frame, a latch member for said hook pivotally carried by said frame, an elongated rod pivotally connected at one end to said latch member and extending rearwardly therefrom, a washer carried by the rear end of said rod, a spring constantly urging said latch member forwardly to latching position, a pair of release levers disposed in confront position, means pivotally securing the outer ends of said levers to said frame, and means securing an intermediate portion of each lever to a trailer coupling member the inner ends of said levers being disposed in a position whereby rearward rocking of said levers by abnormal pull on said trailer coupling members will engage said washer to thereby rock said latch member to released position.

GEORGE W. KASCHMITTER.

REFERENCES CITED

The following references are of record in the file of this patent:

UNITED STATES PATENTS

| Number | Name | Date |
|---|---|---|
| 1,361,166 | Miller | Dec. 7, 1920 |
| 1,375,605 | Pepper | Apr. 19, 1921 |
| 1,859,649 | Den Besten | May 24, 1932 |